Aug. 21, 1956 C. OTTO 2,759,796
PRODUCTION OF SULPHATE OF AMMONIA
Filed Nov. 13, 1950 3 Sheets-Sheet 1

INVENTOR
CARL OTTO
BY
John E. Hubbell
ATTORNEY

Aug. 21, 1956  C. OTTO  2,759,796
PRODUCTION OF SULPHATE OF AMMONIA
Filed Nov. 13, 1950  3 Sheets-Sheet 2

INVENTOR
CARL OTTO
BY
John E. Hubbell
ATTORNEY

Aug. 21, 1956

C. OTTO 2,759,796

PRODUCTION OF SULPHATE OF AMMONIA

Filed Nov. 13, 1950

THOUSANDS OF GALLON OF INLET SPRAY LIQUOR PER TON OF SALT

INVENTOR
CARL OTTO

BY
John E. Hubbell
ATTORNEY

United States Patent Office 2,759,796
Patented Aug. 21, 1956

2,759,796
PRODUCTION OF SULPHATE OF AMMONIA

Carl Otto, Manhasset, N. Y.

Application November 13, 1950, Serial No. 195,254

13 Claims. (Cl. 23—119)

The general object of the present invention is to provide an improved method of an apparatus for producing ammonium sulphate from coke oven gas. More specifically, the object of the present invention is to improve the method of and apparatus for producing ammonium sulphate from coke oven gas heretofore invented by me, and which is disclosed and generically claimed in my prior Patent 2,599,067, granted June 3, 1952 on my patent, filed March 15, 1948, and various forms of which are also disclosed in earlier applications filed by me and referred to in said patent.

That method my be appropriately designated the liquor and crystal spray dispersion method of producing sulphate of ammonia, as it is characterized by the continuous spraying of a finely subdivided, saturated, solution of ammonium sulphate in dilute sulphuric acid and entrained ammonium sulphate crystals, into a substantially unobstructed scrubbing space through which coke oven gas is continuously passed. In said scrubbing space, the spray solution or liquor is supersaturated as a result of its absorption of ammonia from the coke oven gas, and small crystals are created, or "born," and the crystals entrained in the entering liquor increase in size or "grow."

The primary object of the present invention is to so improve the liquor and crystal dispersion method of producing sulphate of ammonia that ammonium sulphate crystals of a relatively large average size may be produced by the use of a smaller amount of scrubbing liquor per ton of the ammonium sulphate crystals produced than has been required heretofore.

A more specific object of the present invention is to bring the coke oven gas treated into initial contact in a relatively small section of the scrubbing space with a sufficiently large portion of the spray liquor and entrained crystals, as to almost instantaneously combine the major portion of ammonia in the gas with the sulphuric acid in the spray liquor, without supersaturating the spray liquor then coming into contact with the gas to an extent resulting in the formation of an excessively large number of crystal nuclei. In practice, the supersaturation of the liquor sprayed into the initial contact section of the scrubbing space may advantageously be kept below one half of one per cent when the production of relatively large crystals is desirable. In the ordinary use of the present invention as hereinafter described, I believe that at least 90% of the ammonia in the gas is thus caused to combine with sulphuric acid practically instantaneously in a small portion of the scrubbing space.

In the usual and preferred mode of use of said liquor and crystal dispersion method, the entrained crystal content of the spray liquor is sufficient to produce a significant desupersaturating effect in the scrubbing space on the liquor supersaturated therein. The desupersaturating effect of the entrained crystals thus reduces the net supersaturation of the spray liquor passing through the scrubbing space. The crystals sprayed into and produced in the scrubbing space and the spray liquor supersaturated therein, pass from the scrubbing space into a crystallizing bath space in which the supersaturated liquor deposits ammonium sulphate in crystalline form on the crystals of the liquor and causes the crystals to grow and desupersaturate itself. Most of the liquor desupersaturated in the crystallizing bath is passed from the latter, along with entrained crystals, back into the scrubbing space as spray liquor.

The scrubbing space, the crystallizing space, and associated conduit means form a recirculation flow path or circuit which is continuous, or closed on itself, and through which liquor is continuously passing from each of said spaces into the other. A portion of the liquor desupersaturated in the crystallizer bath is withdrawn therefrom and along with its entrained crystals is passed to a centrifuge or other crystal separating apparatus, from which the crystals separated are withdrawn for use or storage, while the liquor from which crystals have been separated is ordinarily returned to the continuous or recirculation flow path. Make-up acid is added to the spray liquor and water is passed into the scrubbing space as required to compensate for the evaporation of water from the spray liquor and for the conversion of sulphuric acid into ammonium sulphate.

The liquor and crystal dispersion method of producing ammonium sulphate is now in successful commercial use in this country and has been shown to have important practical advantages over prior methods for producing ammonium sulphate from coke oven gas. One of those advantages, of especial importance in connection with the present invention, is that it permits a great reduction in the bulk of the apparatus heretofore used to convert the ammonia content of a given volume of coke oven gas into ammonium sulphate. Of still more immediate importance, is the fact that customarily conversion of a large portion of the ammonia content of the coke oven gas into ammonium sulphate, partly in the form of solution and partly in crystalline form, is effected in the small portion of the scrubbing space in which the coke oven gas initially comes into contact with finely sub-divided ammonium sulphate liquor and entrained crystals sprayed into said space.

Most of the ammonium sulphate produced from coke oven gas in this country now and for many years past, has been produced in ammonia saturators of the "cracker pipe" type. The conventional cracker pipe type saturator, one form of which is shown in the Becker Patent No. 1,366,111 of January 18, 1921, comprises a tank enclosing a lower bath space containing acidified saturated ammonium liquor and crystals, and a gas space above the bath space. In such a saturator, coke oven gas is passed into scrubbing contact with the bath liquor through a so called cracker pipe having gas outlets submerged in the bath liquor and through which gas passes under pressure into the bath liquor. The gas thus injected into the liquor bath, escapes therefrom by bubbling up through the portion of the liquor bath above the cracker pipe gas outlets into a gas space above the bath liquor. That space is usually of substantial vertical extent, so that it permits much of the liquor moved upward above the bath level by the gas escaping from the bath, to separate from the gas and drop back into the bath. In the practical, every day use of one vertical saturator of the liquor and crystal dispersion type, designed and erected under my supervision to replace a plurality of conventional cracker pipe saturators, the amount of coke oven gas handled per unit of time per square foot of horizontal cross section, is about 16 times the amount of gas handled per square foot of horizontal cross section in each of the cracker pipe saturators replaced.

In the operation of the conventional cracker pipe type saturator of the prior art, the injection of the gas into the bath liquor at a substantial distance below the top of the bath, results in a gas pressure drop corresponding to a water head of from 16 to 30 inches. In the use of the liquor and crystal dispersion method, the total pressure drop in the gas scrubbing space and in the associated external acid catcher corresponds to a water head of about 5 or 6 inches only. Thus, the liquid and crystal dispersion method has the important practical advantage over the conventional cracker pipe method of the prior art, of substantially reducing the cost of the gas pumping operation required to move the gas through the scrubbing apparatus. That the use of the liquor and crystal dispersion method would result in a substantial saving in gas pumping costs was quickly recognized, but some prospective users objected that some of the gas pumping saving obtained would be offset by the cost of pumping the spray liquor and entrained crystals through their closed flow circuit.

The initial installation of apparatus devised by me for use in the practice of the liquor and dispersion method of producing sulphate of ammonia, was designed and is operated to spray into the scrubbing space about 20,400 gallons of spray liquor and entrained crystals per ton of ammonium sulphate salt produced under average operating conditions.

In said initial installation, the gas scrubbing space is vertically elongated, and receives the coke oven gas treated at its lower end through a lateral inlet from the horizontally disposed discharge end of a gas supply pipe, and discharges the gas through an outlet at the upper end of the scrubbing space. About 3,100 gallons of the above mentioned 20,400 gallons or so of spray liquor per ton of salt produced, is sprayed into a small lower section of the scrubbing space through the lateral inlet by a spray nozzle located in said supply pipe with its axis horizontal and substantially coaxial with the said inlet. The remaining 17,300 gallons or so of spray liquor and crystals is sprayed downwardly into the upper portions of the scrubbing space by a spray nozzle at the top of the scrubbing space, and by a second spray nozzle at a lower level.

The said initial installation of liquor and crystal dispersion apparatus has been highly successful from the start. It eliminates about 99.7% of the ammonia content of the coke oven gas when the latter is passing at an average rate of from 80 million to 92 million cubic feet per 24 hour day through the apparatus scrubbing space. The ammonium sulphate crystals produced in said initial installation are quite small, however. The small size of the ammonium sulphate crystals produced is not objectionable for the use made of the crystals produced in said initial installation. In some cases, however, relatively large ammonium sulphate crystals are practically desirable. In Europe, there has long been a substantial demand for ammonium sulphate crystals or salt of the grade referred to as "Grade I," and also as "Grade A" salt composed of crystals, 40% of which are too large to pass through a 35 mesh screen, and of which only 5% are small enough to pass through a 70 mesh screen. In this country, there is now a small demand, which may increase, for Grade I ammonium sulphate salt, and for salt containing still larger crystals.

It has long been an accepted principle in the general crystallization art, that a reduction in the extent of supersaturation of a crystal forming solution will reduce the number and increase the average size of the crystals produced. However, I believe I was the first to conceive and utilize the idea that the size of ammonium sulphate crystals produced by the liquor and crystal dispersion method is primarily dependent upon the amount of liquor and crystals sprayed into contact with the coke oven gas passing through a relatively small initial section of the scrubbing space. The present invention is based on that idea. In the practice of the present invention, use may be made of my further idea that the average size of the crystals produced can be controlled by varying the amount of spray liquor with entrained crystals sprayed into said initial scrubbing space section, without correspondingly increasing and decreasing the amount of liquor and crystals necessarily sprayed into remaining and larger section of the scrubbing space, to recover a suitably large portion of the ammonia content of the coke oven gas not separated from the gas in said initial section.

I believe that the described regulation of the size of the crystals produced is made possible, and explained, by the fact that the maximum supersaturation of ammonium sulphate liquor occurs in said initial contact section of the scrubbing space. In consequence, a large portion of the new ammonium sulphate crystals formed in the process, are formed in said initial contact section. Furthermore, the number of new crystals formed increases and decreases as the amount of liquor and crystals sprayed into said initial scrubbing space section respectively decreases and increases. The size of the crystals produced, increases and decreases as the number of new crystals formed decreases and increases.

In the preferred mode of producing ammonium sulphate crystals of relatively large size in accordance with the present invention, I spray saturated ammonium sulphate liquor entraining a substantial volume of sulphate crystals into a lower section of the scrubbing space through a single spray nozzle at a rate of not less than twenty thousand and not greater than sixty thousand gallons of liquor and entrained crystals per ton of salt produced.

Heretofore it has been my practice to spray liquor and entrained crystals into the lower portion of the spray saturator through a spray nozzle which is located in the discharge end portion of the gas inlet or supply pipe, and is arranged to discharge a conical jet of liquor and entrained crystals into the scrubbing chamber through its gas inlet opening. In the preferred form of the present invention, however, I spray liquor into the lower portion of the scrubbing space in the form of a hollow cone or umbrella shaped jet, through a nozzle located in the scrubbing space at a level above the gas inlet. That nozzle is so disposed that the axis of the hollow jet discharged is directed toward and intersects the gas inlet. The inflow gas stream passing into the scrubbing space from the supply pipe thus opens into the conical portion of the scrubbing space surrounded by the hollow jet.

In consequence, the volume of the space in which the gas comes into initial contact with the spray liquor and crystals, is much larger than it can be when the initial contact of the gas and liquor occurs in the discharge end of the gas inlet pipe. I believe that this mode of effecting the initial contact of the gas and spray liquor will result in a lower maximum degree of liquor supersaturation than is produced when the first contact of the gas with the spray liquor occurs in the inlet pipe. Advantageously the nozzle through which the liquor is sprayed into contact with the entering gas is of a type adapted to discharge less finely divided liquor than is discharged by the inlet spray nozzles heretofore used by me.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1b illustrates a modification of a portion of the apparatus shown in Fig. 1a;

Figures 1, 2:
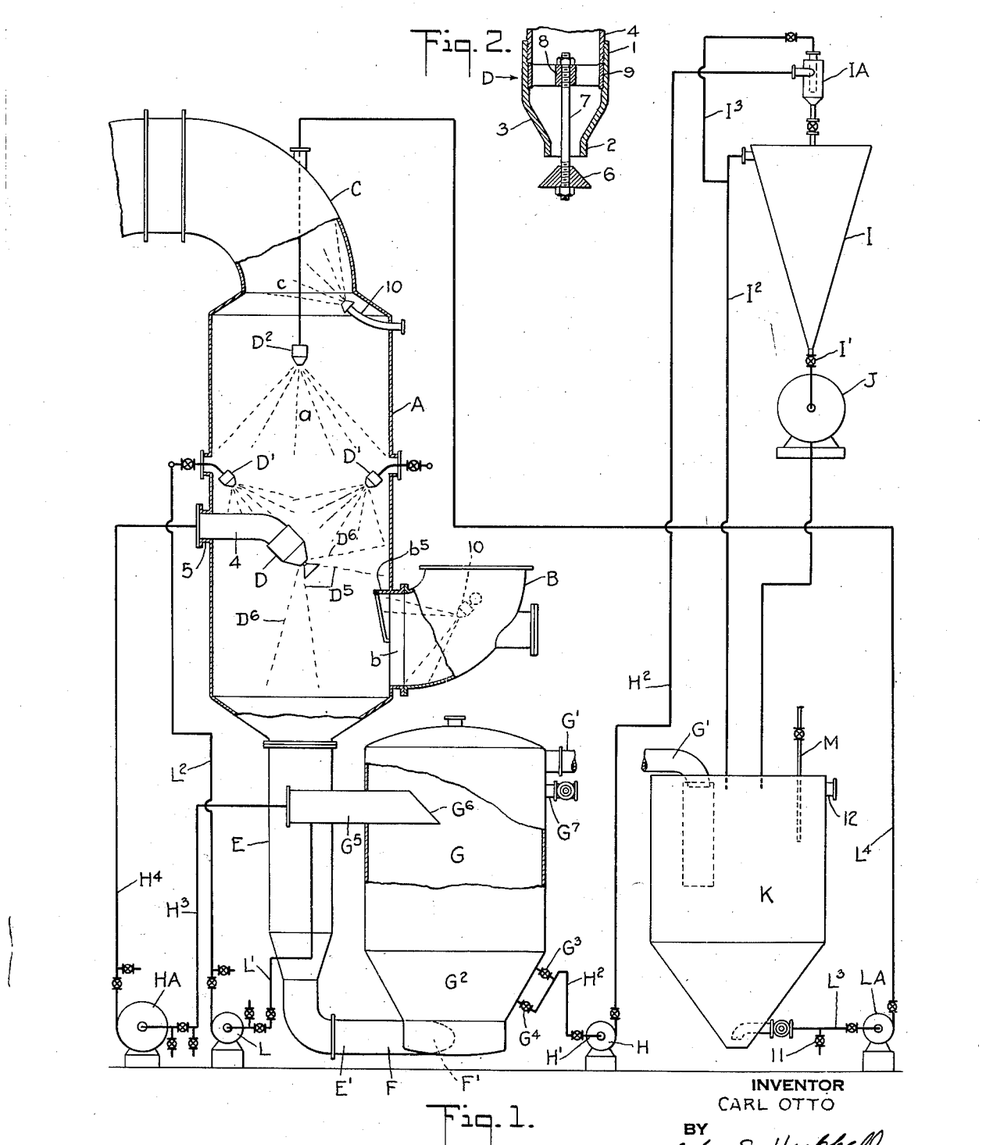
Fig. 1 is a flow diagram showing one form of liquor and crystal dispersion apparatus.
Fig. 2 is a sectional elevation of a spray nozzle shown on a smaller scale in Fig. 1.

The apparatus shown in Fig. 1 is of a general design or form disclosed and claimed in my above mentioned prior patent, and now in use in several installations made under my supervision. In Fig. 1, A represents a vertical scrubber tank enclosing a vertically elongated scrubbing space or chamber $a$. Coke oven gas containing a small amount of ammonia is passed into the lower end portion of the space $a$ from a gas supply pipe B through a gas inlet opening $b$ in the vertical tank wall. The gas thus passing in a horizontal direction into the scrubbing space or chamber $a$, through the inlet $b$ turns and moves upward through the body portion of the chamber $a$ into the upper end portion of that chamber, and passes out of the tank A into the gas line pipe C through an outlet opening $c$ in the vertical tank wall.

In Fig. 1, liquor is sprayed into the scrubber chamber $a$ through a lower spray nozzle D, two intermediate spray nozzles D', and an upper or top nozzle $D^2$. The liquor sprayed into and falling down through the chamber $a$, passes away from the latter through a liquid discharge pipe E. The latter comprises a vertical section extending downwardly beneath the tank A and having its upper end in communication with the lower end of the space $a$, and comprises a lateral section E' connecting the lower end of the first mentioned section to the tangential inlet F' of a tank G. The spray liquor falling to the bottom of the chamber $a$ drains out of the latter through the discharge pipe E. The latter and the tank G provide a liquor seal between the scrubbing space $a$ and the atmosphere with which the tank G may be in communication at its upper end.

The horizontal stream of liquor and crystals passing away from the space $a$ through the conduit E passes tangentially through the inlet connection F into the tapered lower end portion $G^2$ of the tank G. The liquor and crystals thus passing into the tank G form a stream flowing spirally around the axis of the tank G, and upward therein with a velocity which diminishes as the distance above the tangential inlet F increases. The spiral velocity in the lower portion of the tank G is high enough to produce a centrifugal force, action which supplements the gravitational tendency of the larger crystals to separate from the smaller crystals in the lower portion of the tank.

The tank G has an overflow outlet G' at its upper end and has two slurry outlets $G^3$ and $G^4$ opening from the hopper bottom portion $G^2$ of the tank at upper and lower levels, respectively. Intermediate the tank section $G^2$ and overflow outlet G', the tank G is provided with a lateral outlet $G^5$ having a horizontal extension within the tank which is cut away at its inner end to form an upwardly facing, inclined inlet $G^6$ adjacent the axis of the tank. For a purpose hereinafter mentioned, the tank G is formed with a valved outlet $G^7$ opening from the tank at a level below the level of the outlet G'.

In operation, the supersaturated liquor passing from the space $a$ into the tank G, deposits ammonium sulphate in crystalline form on the crystals with which it is in contact and thereby desupersaturates itself, partly in the conduit E, and partly in the tank G. The tank G serves as an efficient crystallizer and classifier as a result of the flow conditions therein. Those conditions are such as to maintain the crystals in suspension in the tank, with the crystals diminishing in average size as the distance from the lower end of the tank increases. The larger crystals which tend to congregate in the tapered portion $G^2$ of the tank G, are withdrawn from the latter through one or both of the valved outlets $G^3$ and $G^4$ by a pump H. The latter has its inlet pipe H' connected to the outlets $G^3$ and $G^4$. The discharge pipe $H^2$ of the pump H passes the slurry withdrawn from the tank G to a tapered feed or settling tank I, through a cyclone separator IA. The tank I has a valved outlet I' at its lower end through which crystals mixed with a small amount of liquor passes to a drier J which is ordinarily a centrifuge. Liquor is supplied to the feed tank I more rapidly than it is discharged through the outlet I', so that liquor is normally passing away from the tank through an overflow pipe $I^2$. Liquor also overflows from the separator IA through a drain pipe $I^3$, which as shown, discharges into the pipe $I^2$. The latter discharges into an overflow port K. The main supply of liquor and entrained crystals to the tank K is received through the overflow pipe G' from the tank G.

As shown in Fig. 1, liquor and crystals are withdrawn from the tank G through its outlet $G^5$ by pumps HA and L, which have their respective inlet pipes $H^3$ and L', connected to the outlet $G^5$. The discharge pipe $H^4$ of the pump HA delivers liquor and crystals to the spray nozzle D. The liquor and crystals withdrawn from the tank G by the pump L are passed through the outlet pipe $L^2$ of that pump to the intermediate nozzles D'. A pump LA withdraws liquor and crystals through its inlet pipe $L^3$ from the lower end of the hopper bottom portion of the overflow pot K, and passes the liquor and crystals so withdrawn through the pipe $L^4$ to the upper spray nozzle $D^2$. Make-up sulphuric acid is added to the liquor passing to the scrubbing tank A by means of an acid supply pipe M having its lower discharge end immersed in the liquor in the overflow pot K.

The intermediate and upper spray nozzles D' and $D^2$ may well be of the commercially available, non-clogging type of atomizing nozzles disclosed in the Eneas Patent 1,101,264, granted June 23, 1914. In accordance with the present invention, the nozzle D should be of some type or form adapted to produce a spray of the hollow cone or umbrella form. Thus, for example, the nozzle D may be of the form and type shown in Figs. 1 and 2, in which the nozzle comprises a hollow body portion 1, an outlet portion 2, and a hollow intermediate tapered or conical portion 3, each of said portions being circular in cross section. As shown, the upper end of the body portion 1 is internally threaded to receive the downwardly inclined, externally threaded end of a bent pipe section 4. The latter has a horizontal body portion mounted in a pipe outlet 5 of the tank A. As diagrammatically shown in Fig. 1, the discharge pipe $H^4$ of the pump HA is connected to the outer end of the pipe section 4. The spray stream discharged through the nozzle D, is given its umbrella or hollow conical form by a cone 6. The latter is coaxial with the outlet portion 2, and is supported by the outer end of a stem or rod 7. As shown, the ends of the rod 7 are threaded. The threaded ends of the rod 7 respectively extend through an internally threaded axial passage in the cone 6, and through an internally threaded passage in the hub rod portion of a supporting spider 8.

The fineness of the subdivision of the liquor discharged by the nozzle D may be regulated by rotating the stem 7 relative to either or both the cone 6 and spider hub. As shown lock nuts are threaded on the ends of the stem 7. The spider 8 has a peripheral ring portion 9 received in a recessed seat formed in the body 1 and held against longitudinal displacement by the threaded inner end of the pipe section 4.

The volume and velocity of the liquid discharged by the nozzle D are advantageously made sufficient to insure that the hollow spray jet discharged, will extend from the nozzle into contact with the wall of the tank A, and the liquor passing through conduit E. In consequence, the conical jet forms an extended screen wall spaced away from the gas inlet, and having an average base diameter substantially greater than the diameter of the gas inlet $b$. The screen wall formed by the hollow jet, increases in thickness as the distance from the nozzle D increases in the general manner indicated in Fig. 1, in which $D^5$ designated individual jets forming a portion of the inner surface of the screen wall, and $D^6$ designates individual jets included in the outer wall of the screen. The hollow conical spray discharged by the nozzle D differs radically from the so-called solid conical jet or spray discharged by the atomizing type nozzle DD. Said solid conical spray jet comprises individual jets intersecting a plane transverse to the axis of the solid conical spray at points distributed more or less uniformly across the circular section of the cone defined by the plane.

Figure 1A:
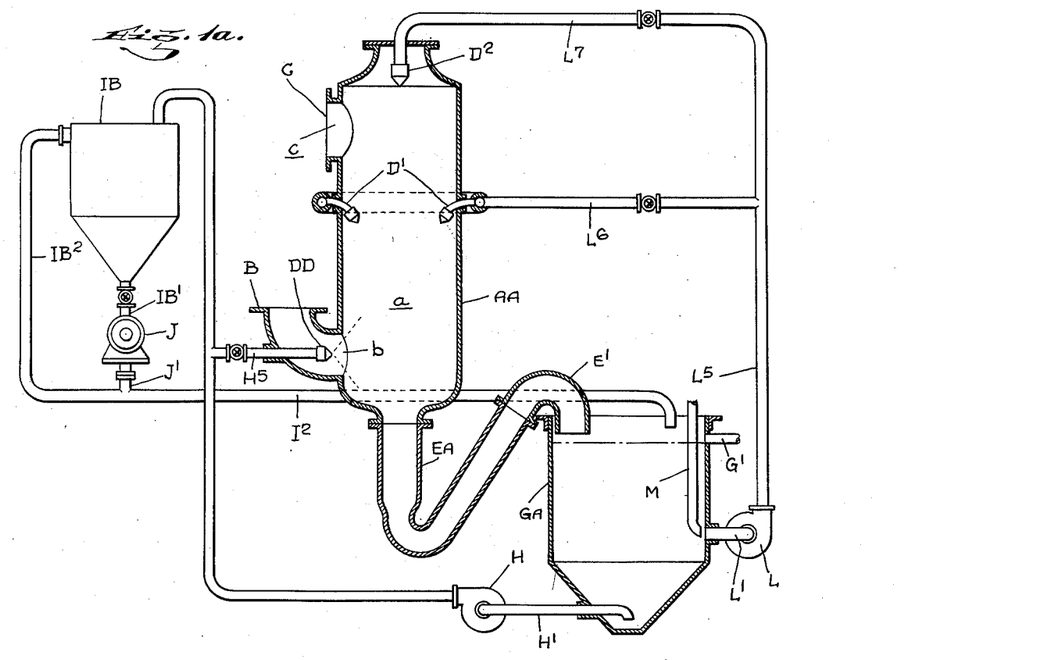
Fig. 1a is a flow diagram showing a modification of the apparatus shown in Fig. 1.
Figure 1B:
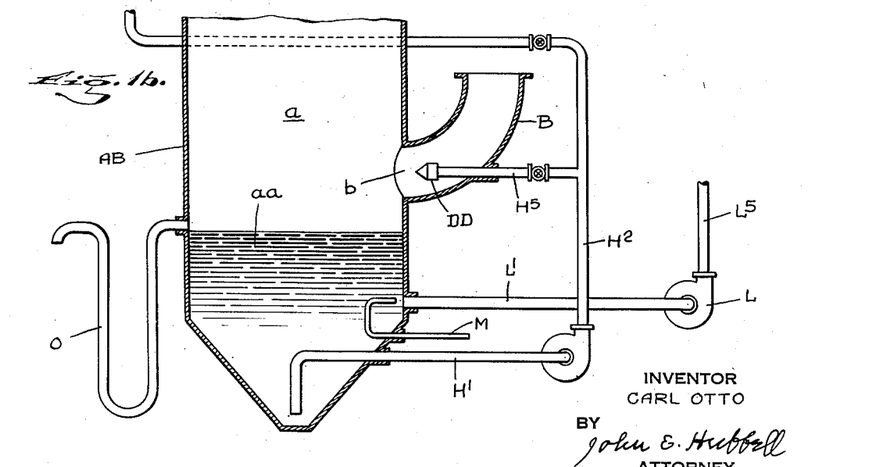

As the gas passes through the inlet pipe B into the scrubbing space, the gas stream expands somewhat. The portion or percentage of the gas in the stream which contacts substantially simultaneously with the liquor in the hollow jet or spray discharge by the nozzle D, is appreciably greater than it is when the liquor is discharged in the form of a solid conical jet into the gas stream passing into scrubbing space through the inlet pipe B, as it does in the apparatus illustrated in Figs. 1$a$ and 1$b$, and hereinafter described. In consequence, the ratio of each small portion of the liquor discharged by the nozzle D, to the portion or volume of the gas which comes substantially instantaneously into initial contact with said small liquor portion, is more uniform in all portions of the screen wall formed by the hollow jet, than it can be in all portions of the solid conical liquor jet discharged by the nozzle DD of Figs. 1$a$ or 1$b$. A shroud or hood portion $b^5$ of the pipe B, may or may not extend into the scrubbing space $a$, to prevent liquor engaging the outer wall of the shroud from passing directly into the gas issuing from the pipe B.

The apparatus shown in Fig. 1 may vary widely in its dimensions and in details of construction as conditions may make desirable. It is noted by way of illustration and example, that for the contemplated uses of the apparatus shown in Fig. 1, the apparatus diagrammatically shown in Fig. 1, is of a type and form intended for use in converting the ammonia content of coke oven gas, supplied at the rate of eighty million cubic feet per day, into ammonium sulphate crystals of greater average size than the so called Grade I or Grade A crystals. For such use liquor and crystals are passed into the scrubber A through the lower, intermediate and upper nozzles D, D' and $D^2$, by the pumps HA, L, and LA, respectively, at the respective rates of 2,500 gallons, 400 gallons, and 600 gallons per minute. Eighty million cubic feet of coke oven gas will produce about eighty tons of ammonium sulphate. With ammonium sulphate liquor and crystals supplied to the scrubber A at the rate of 3,500 gallons per minute, about 45,000 gallons of liquor and crystals are passed into the scrubbing space A per ton of ammonium sulphate produced, the inlet and outlet pipes connected to the pump HA are 14 inches in diameter; the inlet and outlet pipes connected to each of the pumps L and $L^4$, are 6 inches in diameter; and the normal discharge pressures of the pumps HA, L and $L^4$ correspond to a liquor head of 40 feet, 84 feet and 70 feet, respectively. The pump H is intended to normally pass liquor and crystals to the cyclone separator IA at a rate of 150 gallons per minute, and its delivery pressure corresponds to a liquor head of 90 feet. The scrubbing tank A has a diameter of 7½ feet and the height of its cylindrical body portion is approximately 15½ feet. The crystallizer tank G has a body portion diameter of 7 feet and an overall height of 13 feet.

In the operation of the apparatus shown, the amount of liquor and crystals discharged by each nozzle may be regulated by varying the size of the nozzle and by varying the pressure at which liquor is supplied to the nozzle, and, in the case of the nozzle D, by adjusting the cone 6 toward and away from the nozzle outlet portion 2. The effective liquor pressure at which liquor is supplied to each spray nozzle can be regulated by varying the speed of the corresponding supply pump or by varying the adjustment of throttling devices in the pump lines. The latter ordinarily includes valves arranged for use either as cut-off valves or as throttling valves.

The size of the crystals passed from the crystallizer to the separator IA by the pump H may be increased by decreasing the rate at which liquor and crystals are withdrawn from the crystallizer by the pump H. The effect of reducing that rate is to prolong the period during which the larger crystals are held in suspension in the tank G. A reduction in the rate at which liquor and crystals are passed away from the crystallizer G by the pump H, also increases the average size of the small crystals passing away from the tank G through the outlet $G^6$ and through the overflow pipe connection G'. The resultant increase in the size of the crystals sprayed into the scrubbing space $a$ through the nozzles D, D' and $D^2$ directly increases the average size of the crystals passing from the scrubbing space $a$ to the crystallizer G, and indirectly tends to increase the crystal size of the final crystal output by decreasing the number of seed crystals produced or "born" in the space $a$.

In the production of ammonium sulphate from coke oven gas, it is necessary to guard against the formation of objectionable ammonium sulphate in crystalline, or "rock salt," form, on surfaces with which the ammonium sulphate liquor comes into contact. To minimize the formation of objectionable rock salt deposits in the spray saturator apparatus I have found it practically desirable to heat the walls of the scrubbing chamber A and its liquor outlet conduit E, but have not illustrated such heating means herein which are not claimed herein, and have been illustrated in some of my earlier applications. I have also found it desirable to provide means for spraying steam, hot water or other cleaning fluid into the upper portion of the scrubbing tank. Thus for example, spray nozzles 10 may be provided as shown in Fig. 1.

It is ordinarily desirable, also, to flush out the tank G and conduit E from time to time. This may be accomplished with the apparatus shown in Fig. 1, by adjusting the valves associated with the inlet pipe $L^3$ of pump LA to prevent the latter from drawing liquor out of the pot K and to cause it to pass hot water from the supply pipe 11 to the spray nozzle $D^2$; by closing the valves through which the pumps L and HA are normally in communication with the tank G; and by opening the overflow connection $G^7$ to the tank G. When the described valve adjustments are made, the hot water sprayed into the scrubbing space $a$, will remove sulphate deposits from the inner walls of the space $a$, and of the conduit E and tank G, and particularly the wall surrounding the lower portion of the wall of tank G where troublesome "rock salt" deposits are most apt to form.

At the beginning of the described cleaning operation, the tank G and conduit E are filled with liquor and crystals, which are discharged from the tank G through the outlet $G^7$ as the cleaning operation proceeds, and the tank fills up with hot water. The liquor and crystals thus forced out of the tank G may well be passed to a mother liquor tank or receiver, not shown, from which the liquor may eventually be returned to the liquor and crystal circulation circuit, and caused to replace the water in the tank G as the cleaning operation is completed. The water then forced out of the tank G through the outlet G may be passed to waste.

In normal operation, tar overflowing from the tank G, into the overflow pot K, may be skimmed off the liquor in the pot K, or otherwise removed from the latter. The pot K may be provided with a liquor overflow connection to waste, or to a mother liquor tank.

In some cases the apparatus shown in Fig. 1 may well be simplified by the omission of the pump L. The nozzles D' may then be supplied with liquor through a pipe branch from the discharge pipe $L^4$ of the pump LA. When the pump L is thus eliminated, the capacity of the pump $L^4$ must be increased to supply the liquor which otherwise would be supplied by the pump L. The omission of the latter increases the overflow from the tank GA to the overflow pot K, so that the latter can then supply the liquor requirements of the nozzles D' as well as of the nozzle D.

The apparatus shown in Fig. 1a differs from the apparatus shown in Fig. 1, primarily in the form and disposition of the lower nozzle in the scrubbing space $a$ and in the form and mode of operation of the crystallizing tank. Also, the apparatus shown in Fig. 1a includes no overflow pot separate from the crystallizer tank. The lower nozzle DD of Fig. 1a is similar in type to the nozzle D' and $D^2$ and is mounted in the gas supply pipe $b$. The crystallizer GA of Fig. 1a is a tank open at its upper end and receiving liquor and crystals at its upper end from the space $a$ through the conduit EA. The latter includes a seal forming loop terminating at its discharge end in a goose neck E' having its downwardly directed lower end above the overflow level of the crystallizer GA. The latter is provided with an overflow outlet G'.

A slurry pump H has its inlet pipe H' drawing liquor and crystals from the lower end of the hopper bottom portion of the tank GA, and passes crystals and liquor through its outlet pipe $H^2$ to a conventional feed tank IB, and through a valved branch $H^5$ of the pipe $H^2$, the pump H passes liquor and crystals to the inlet nozzle DD. The feed tank IB passes crystals along with a little liquor through a valved outlet IB' to a centrifuge J. The tank IB is provided with an overflow pipe $IB^2$ which discharges into the tank GA. At an intermediate level the pump L draws liquor and crystals through its inlet pipe L' from the tank GA. The discharge pipe $L^5$ of the pump L of Fig. 1a passes liquor and crystals to the nozzles D' and $D^2$ through valved pipe branches $L^6$ and $L^7$, respectively. The gas outlet connection C of the scrubber AA of Fig. 1a opens from the upper portion of the scrubbing space $a$ through the tank side wall, instead of through the top wall as in Fig. 1. The pipe M supplying make-up sulphuric acid in Fig. 1a, has its discharge end immersed in the liquor in the tank GA, in such proximity to the inlet end of the pipe L', that practically all of the make-up acid is withdrawn from the tank GA by the pump L.

In the apparatus illustrated in Figs. 1 and 1a the coke oven gas moves upward through the main scrubbing space and some of the spray liquor discharged by the spray nozzles is directed downwardly and some is directed horizontally across the scrubbing space. In some cases, however, all or the major portion of the scrubbing liquor and crystals is brought into contact with the spray streams or jets moving in the same general direction as the main gas stream into which the liquor is sprayed. Different forms of apparatus operating in this manner are disclosed and claimed in my prior applications Serial No. 47,562, filed September 3, 1948 and abandoned subsequent to the filing of the application for the instant patent, and Serial No. 82,959, filed March 23, 1949, which matured into Patent No. 2,645,559, issued July 14, 1953.

While I ordinarily prefer to use apparatus like that shown in Figs. 1 and 1a in having its crystallizing space in a tank separate from the scrubbing tank, the scrubbing and crystallizing space may be in the same tank, as it is in some constructions illustrated in my prior Patent No. 2,599,067, and in the structure shown in Fig. 1b.

Fig. 1b shows the lower portion only of a structure differing from that shown in Fig. 1a only in that the lower end portion of the tank AB of Fig. 1b includes a hopper bottom section and forms a liquor and crystal space $aa$ directly beneath the space $a$, and serving the crystallizing and desupersaturating function of the separate tank GA of Fig. 1a. Liquor and crystals are withdrawn from the space $aa$ at different levels through the inlet pipes H' and L' by pumps H and L, respectively, substantially as liquor and crystals are withdrawn from the tank G in Fig. 1. Make-up acid is supplied to the inlet end of the pipe L' of Fig. 1b through a pipe M as in Fig. 1a. The tank AB is provided with a sealed overflow outlet pipe O which may discharge into a mother liquor reservoir, not shown, from which liquor may be returned to the tank AB when the liquor level therein lowers, as is shown, for example, in my application Ser. No. 134,392, filed December 22, 1949, and abandoned since the instant application was filed, and in my Patent 2,599,067. However, the apparatus shown in Fig. 1b may be so operated that in normal operation there is no significant discharge of liquor through the overflow outlet O.

In the previously mentioned initial installation of liquor and crystal dispersion apparatus devised by me, use is made of a tank structure surrounding a scrubbing chamber with a lower or inlet spray nozzle, a single intermediate nozzle, and a top spray nozzle arranged in the same general manner as are the nozzles D and $D^2$ and each of the two intermediate nozzles D' of Fig. 1a. In said initial installation, a crystallizing bath pool of liquor is continuously maintained in the lower end portion of the tank as it is in the tank AB of Fig. 1b.

In said initial installation, the scrubbing space corresponding to the space $a$ of Fig. 1 receives spray liquor and crystals through an inlet nozzle arranged as is the inlet nozzle D of Fig. 1a at the rate of about 170 gallons a minute. The top nozzle and single intermediate nozzle of said initial installation, respectively correspond to the nozzle $D^2$ and to one of the nozzles D' of Fig. 1, and normally discharge liquor and crystals at the respective rates of about 800 gallons and about 170 gallons per minute. In the regular operation of said initial installation, ammonium sulphate is produced at a rate of from about 80 tons to about 92 tons per day, from coke oven gas supplied at a rate varying from about 80 million to about 92 million cubic feet per day. The term "day" as used herein, and as it is generally used in the coke oven art, means a 24 hour day, since ordinarily, the operation of a coke oven plant is continuous from one year end to the next.

In said initial installation, as in all other installations of liquor and crystal dispersion apparatus designed and erected under my supervision, the inlet and top valves discharge liquor which is divided finely enough to form a spray, but which is not as finely divided as is the liquor discharged by the intermediate nozzle or nozzles, and one purpose of the top nozzle is to discharge a spray coarse enough to knock out of the gas passing to the scrubbing space outlet fine entrained liquor particles including, in particular, entrained particles of liquor discharged by the intermediate spray.

The liquor discharged by each of the spray nozzles is supplied to the latter under such pressure that the spray particles move away from the nozzle with a substantial initial velocity. For the purposes of the present invention, the relatively high velocity of the liquor discharged by the inlet nozzle D, and the relatively high velocity at which the gas passes out of the input pipe B and into the scrubbing space, are of especial importance because they contribute to turbulent flow conditions and to a substantially instantaneous contact and reaction of the acid content of the liquor with the ammonia content of the gas. The reaction is especially rapid because initially, the liquor is not supersaturated and the ammonia content of the gas and the free sulphuric acid content of the liquor have their respective maximum values.

In each of the installations of liquor and crystal dispersion apparatus heretofore designed and erected under my supervision, the liquor and crystals discharged by the inlet nozzle corresponding to the nozzle D of Fig. 1a, never gets into more than a small lower fraction of the corresponding scrubbing space, and I believe that the bulk of its combinative reaction with the ammonia content of the gas is completed within a small section of the scrubbing space which probably does not extend more than two or three feet from the inlet $b$.

Figures 3, 3A:
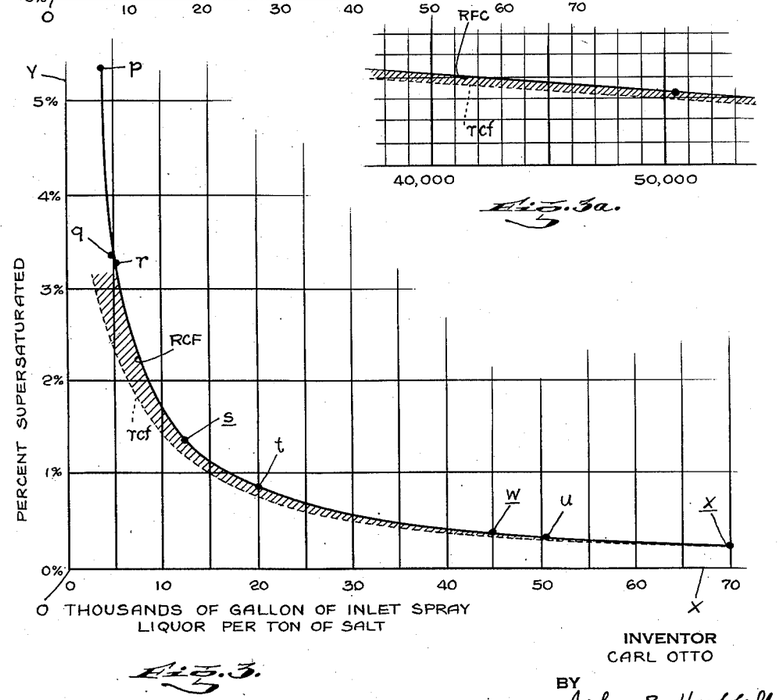
Fig. 3 is a chart illustrating the effects on the operative results of the apparatus illustrated, of variations in the distribution and supply rate of the spray liquor and crystals.
Fig. 3a is a reproduction on a larger scale of a portion of the chart shown in Fig. 3.

While the said initial installation was not intended for operation in accordance with the present invention, and has not been so operated, the comparison of its operating characteristics with those of other installations made in the Fig. 3 chart may be helpful to an understanding of the present invention.

Fig. 3 is a chart illustrating the effect on the maximum supersaturation occurring in the operation of liquor and crystal dispersion apparatus of the type shown in Fig. 1, of variations in the amount of spray liquor and crystals sprayed into the scrubbing space $a$ by the lower nozzle D. For the sake of consistency and ease of comparison in the following explanations, it is assumed that the ammonium sulphate liquor discharged by the nozzle D is a saturated solution of ammonium sulphate in dilute sulphuric acid having a free sulphuric acid content of about 5%, and the average specific gravity of the liquor and entrained crystals is 1.3. Thus a gallon of the liquor and crystal mixture weighs approximately 10.86 pounds. It is noted, however, that for the present purposes, neither the solution temperature, nor the free acid content of the solution, nor its precise specific gravity is critical.

I also assume, and believe I am correct in assuming, that under all of the operating conditions illustrated in Fig. 3, and hereinafter described, not less than 90% of the total amount of ammonium sulphate collectively produced in solution and crystalline form, is produced by the action of the liquor and crystals discharged by the inlet nozzle D.

In testing the above mentioned initial installation, I found that when liquor was sprayed through the inlet nozzle at the rate of 170 gallons per minute, while no liquor was being discharged by the other spray nozzles, about 92% of the ammonium in the coke oven gas was absorbed. I doubt that the amount of ammonia recovered by the liquor discharged by the inlet spray nozzle is significantly decreased by the liquor sprayed into the scrubbing space by the upper and intermediate spray nozzles. The inlet spray particles are discharged with a relatively high velocity and practically all of their ammonia absorbing action is completed in a small fraction of a second. Thus there is only a very short period during which the liquor discharged from the upper nozzles can act on any of the 90% of the ammonia which I believe to be almost instantaneously absorbed by the liquor discharged by the inlet nozzle D.

The absorption of ammonia in the lower end portion of the scrubbing space by the liquor particles discharged by the upper and intermediate nozzles is relatively small because those particles have had their velocity substantially reduced by the upmoving gas stream, and have had their average size substantially increased and their aggregate surface area greatly decreased as a result of the coalescence of liquor which invariably occurs whenever atomized liquid particles are discharged into a gas filled space. The practice of the present invention does not require that the portion of ammonium sulphate produced by the inlet spray liquor initially brought into contact with the ammonia carrying gas should be 90%, or even as large as 70%, of the total ammonium sulphate produced. However, the attainment of the primary object of the present invention does require that the gas scrubbing action of the inlet spray liquor with its entrained crystals should have the following three characteristics: It must separate from the carrying gas a substantial portion, preferably more than 75%, of its ammonia content. It must separate from the gas more ammonia per gallon of liquor, than is separated from the gas by the portion of the spray liquor sprayed into the scrubbing space by the other spray nozzles. The amount of inlet spray liquor must be large enough to prevent a maximum supersaturation in excess of 1%, and in some cases the maximum supersaturation should be less than ½ of one per cent.

On the assumption that 90% or any other definite percentage of the ammonia content of the gas is converted into ammonium sulphate in solution or crystalline form by the liquor sprayed into the scrubbing space by the inlet nozzle, the maximum extent to which that liquor can be thereby supersaturated, can be readily computed by simple arithmetic. Thus for example, when in the normal operation of the previously mentioned initial installation, 80 tons of ammonium sulphate is produced per day, 111 pounds of ammonium sulphate salt is produced each minute, and 170 gallons of ammonium sulphate liquor and crystals weighing 10.86 pounds per gallon, or 1,863 pounds in all, are sprayed into the initial contact portion of the scrubbing space by the inlet spray nozzle in each minute. 90% of 111 pounds may be assumed to be 100 pounds, and the supersaturation effect of the inlet liquor thus adds 100 pounds to the 1,863 pounds weight of the liquor sprayed into the scrubbing space each minute by the inlet nozzle. The 100 pound increase in the weight of the liquor and crystals originally weighing 1,863 pounds, constitutes a supersaturation effect of 5.3%, as is shown by the following equation $$\frac{100}{1863} \times 100 = 5.3$$

The actual maximum supersaturation of the liquor produced under the above conditions is slightly less than 5.3, I believe as a result of the desupersaturating effect of the entrained crystals on the liquor which is sprayed through the inlet nozzle into contact with the carrying gas and is thereby supersaturated. Those crystals grow as a result of the deposit of ammonium sulphate thereon by the supersaturated spray liquor particles which are thus subjected to a desupersaturation effect. While the desupersaturating effect follows and is slower than the saturating effect, I think it probable that the desupersaturating action of the crystals on the inlet liquor sprayed into the scrubbing space during the fraction of a second in which that liquor acquires its maximum supersaturation, is large enough to significantly effect the magnitude of the supersaturation attained. It is also to be noted that any reduction in the supersaturation of the spray liquor in the small initial section of the scrubbing space resulting from the desupersaturation effect of the entrained crystals is beneficial and contributes to the attainment of the objects of the present invention.

Figure 4:
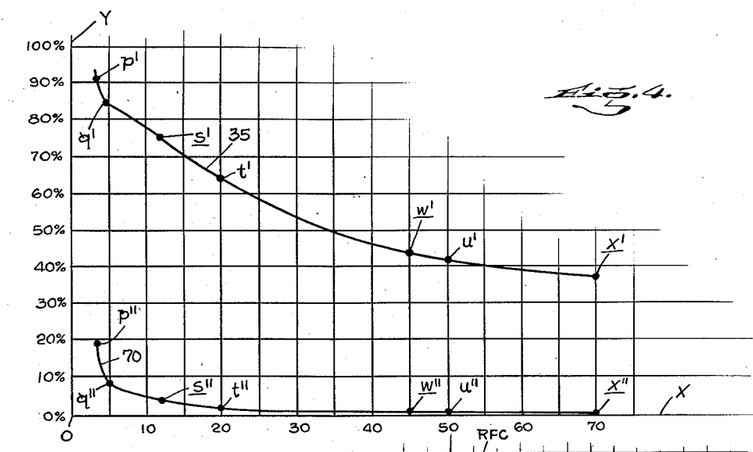
Fig. 4 is a chart illustrating the effect of variations in the amount of spray liquor initially contacting the ammonia carrying gas on the numbers of crystals of different sizes formed.

The practical feasibility of controlling the average size of the ammonium sulphate crystals produced by apparatus of the general character shown in Fig. 1, by increasing and decreasing the amount of inlet nozzle spray liquor, without correspondingly increasing and decreasing the remainder of the liquor sprayed into the scrubbing space, has been demonstrated by results obtained in the commercial use of such apparatus and graphically illustrated by the charts shown in Figs. 3 and 4.

In the chart shown in Fig. 3, the scale along the abscissas line O—X is graduated in thousands of gallons of lower nozzle spray liquor per ton of salt produced, and the scale along the ordinate line OY, is graduated in units indicating the supersaturation percentage of the lower spray liquor produced by its contact with the ammonia carrying gas. The intersection of the lines OX and OY is the zero point of each scale. Thus the horizontal distance between the line OY and any point on the curve $p$—$x$, is a measure of the thousands of gallons of lower nozzle spray liquor per ton of salt produced required to saturate that liquor to the extent indicated by the vertical distance between the said point and the line OX.

The position of points $p$, $q$, $r$, $s$, $t$, $u$, $w$ and $x$ on the curve $p$—$x$, relative to the lines OX and OY of Fig.

3, indicate characteristic performance features of apparatus of the general character shown in Fig. 1, under the different operating conditions, respectively identified by the numbers 1, 2, 3, 4, 5, 6, 7, and 8 in the left hand column of the following chart.

FIGURE 3.—CHART DATA TABLE

| Condition | Point | Salt Output | | Lower Nozzle Liquor | | | Supersaturation, S-S |
|---|---|---|---|---|---|---|---|
| | | T.P.D. | P.P.M. | G.P.M. | P.P.M. | G.P.T. | |
| | | a | b | c | d | e | f |
| | | | | | | | Percent |
| 1 | p | 80 | 111 | 170 | 1,863 | 3,060 | 5.36 |
| 2 | q | 50 | 69 | 170 | 1,863 | 4,900 | 3.32 |
| 3 | r | 50 | 69 | 177 | 1,922 | 5,100 | 3.23 |
| 4 | s | 44 | 61 | 370 | 4,055 | 12,100 | 1.36 |
| 5 | t | 20 | 27.8 | 278 | 3,044 | 20,000 | .82 |
| 6 | u | 20 | 27.8 | 700 | 7,162 | 50,400 | .34 |
| 7 | w | 80 | 111 | 2,500 | 27,150 | 45,000 | .37 |
| 8 | x | 20 | 27.8 | 972 | 9,655 | 70,000 | .26 |

$$b' = \frac{a \times 2000}{1440} \quad (1)$$

$$d' = c'(10.86) \quad (2)$$

$$e' = c' \frac{1440}{a'} \quad (3)$$

$$f' = \frac{b' \times .90 \times 100}{d'} \quad (4)$$

In the foregoing Chart data table, the point $p$ designates, or identifies, the regular operating condition 1, of the previously mentioned initial installation apparatus in which 3,060 gallons of liquor and crystals per ton of salt produced is sprayed into the small initial contact section of the scrubbing space of the apparatus, by the lower or inlet spray nozzle, and in which the computed supersaturation of the liquor so sprayed into said section is 5.3%. This point $r$ designates the operating condition 2, in which as a result of a reduction in the demand for coke, the same initial installation apparatus was operated for a period of weeks to produce only 50 tons of ammonium sulphate per day, with no change in the rate at which liquor and crystals was sprayed into the scrubbing space by the different spray nozzles. During that period 4,900 gallons of liquor were sprayed through the lower nozzle for use in the production of each ton of ammonium sulphate, with the result that the computed supersaturation of the inlet liquor was then 3.32%. The points $r$, $s$ and $u$ illustrate the operation of different installations under the conditions 3, 4 and 6, respectively, which are set forth in the chart data table. Each of the points $t$, $w$ and $x$ illustrate the estimated performance of a different installation not yet in the process of construction.

In the chart data table, the numbers 80, 50, 50 etc., in the "T. P. D." column $a$, denote salt output in tons per day of the different operating conditions to which points $p$, $q$, $r$, $s$, $t$, $u$, $w$ and $x$ in the "Point" column of said table pertain;

The numbers 111, 69, etc. in the "P. P. M." column $b$, denote the salt output in pounds per minute of the different installations;

The numbers 170, 170, etc. in the "G. P. M." column $c$, denote the gallons of spray liquor and crystals sprayed by the lower nozzle per minute into the scrubbing spaces of the different installations;

The numbers 1863, 1863, etc. in the "P. P. M." column $d$, denote the pounds of liquor and crystals sprayed into the scrubbing spaces of the different installations by the lower nozzle per minute;

The numbers 3060, 4900, etc. in the "G. P. T." column $e$, denote the pounds of liquor and crystals sprayed into the scrubbing spaces of the different installations by the lower nozzle during the period required for production of a ton of salt;

The numbers 5.36, 3.32, etc., in the "S–S" column $f$, denote the computed supersaturation of the liquor sprayed by the lower nozzle into the scrubbing spaces of the different installations; and The relations between the numbers in the different columns $a$, $b$, $c$, $d$, $e$, and $f$ pertaining to each of the points $p$, $q$, $r$, etc., are shown by the Equations 1, 2, 3, and 4 at the bottom of the foregoing Figure 3 Chart data table.

In using those equations to relate the numbers in any one horizontal row of numbers in the Chart data table pertaining to the points $p$, $q$, etc., or $x$ in that row, the equation symbols $a'$, $b'$, $c'$, $d'$, $e'$, and $f'$ should be replaced by the numbers in the respective columns $a$, $b$, $c$, $d$, $e$, and $f$ found in said horizontal row.

In the Chart data table Equations 1, 2, 3, and 4, the numerical constants 2,000, 1,440, 10.86, and .90, respectively represent the number of pounds in a ton, the number of minutes in 24 hours, the weight in pounds of a gallon of ammonium sulphate liquor and crystals having a specific gravity of 1.3, and the percentage of the ammonia content separated from the carrying gas by the liquor and crystals sprayed through the lower nozzle.

As will be apparent, none of the numerical values in the Chart data table columns $a$, $b$, $c$, $d$, and $e$ is based on assumption as distinguished from a measurable value. The supersaturation percentages in the Chart data table column $f$, are based on the assumption that 90% of the total ammonia content of the coke oven gas is separated from the latter by the liquor and crystals sprayed into contact with the gas by the lower nozzle corresponding to the nozzle D of Fig. 1, or of Figs 1a and 1b. It is to be noted, however, that if the assumed .90 factor of Equation 4 were replaced by .80 or .70 or .60, there would be no change in the relative order of the percentages in the column $f$, and the replacement would result in quite small increases in the supersaturation percentage values for operation in the range in which the inlet nozzle liquor gallons shown in the G. P. T. column $e$ of the Chart data table is as great as 20,000 gallons.

The following table includes the results of comparable screen tests to determine the sizes of the salt crystals produced in the regular operation of liquor and crystal dispersion apparatus of the character shown in Fig. 1, under the prespective conditions 1, 2 and 4 of the foregoing Chart data table.

SCREEN TEST TABLE

*Percentages of ammonium sulphate salts resting on and passing through 35 and 70 mesh screens*

| | 1 | 2 | 4 | 6 |
|---|---|---|---|---|
| | Percent | Percent | Percent | Percent |
| Resting on a 35 mesh screen | 9.4 | 16 | 23.2 | 48 |
| Resting on a 70 mesh screen | 71.8 | 75.5 | 70.5 | 50.6 |
| Passing through a 70 mesh screen | 19.2 | 8.5 | 5.25 | 1.9 |

The effect of reducing the supersaturation of the inlet spray liquor on the size of the crystals is made plainly apparent by the foregoing table. Thus in operation under condition "1" of the previously mentioned Chart data table, in which 3,060 gallons of inlet spray liquor and crystals is used in the production of a ton of salt, only 9.4% of the salt produced consisted of crystals large enough to be arrested by a 35 mesh screen, and 19.2% of the crystals were small enough to pass through a 70 mesh screen, whereas in operation under Chart data table condition "4" in which 12,100 gallons of inlet spray liquor and crystals were used in the production of salt, 23.2% of the crystals were too large to pass through a 35 mesh screen, and only 5.25% of the crystals were small enough to pass through a 70 mesh screen.

As has been stated, the primary purpose of the present invention is to produce ammonium sulphate crystals of relatively large size with the use of less ammonium sulphate liquor per ton of ammonium sulphate salt produced than has been required heretofore. The crystal sizes of the condition 4 salt set forth in the foregoing Screen test table are large enough to satisfy the bulk of the present demand for ammonium sulphate salt in this country. Substantially larger crystals are open to the objection that they must be reduced in size by a crystal grinding or breaking action to adapt them for some important uses.

However, I devised a plant operating under Chart data table condition 6, with the intent and expectation that it would produce larger crystals than are produced under operating condition 4, and the Screen test table shows that my expectation was realized. I now anticipate that an installation of the character shown in Fig. 1, and arranged for operation under Chart Table table condition 7 will produce larger crystals than have been obtained with apparatus of the character shown in Fig. 1a used under operating condition 6. I believe that the replacement of an inlet nozzle like the nozzle DD of Figs. 1a and 1b, by a nozzle D arranged and constructed as shown in Figs. 1 and 2, will substantially increase the uniformity of the ratio of the gas and liquor coming into contact in all portions of the hollow jet discharged by the nozzle D. I anticipate that such increase in uniformity will decrease the maximum liquor supersaturation of the liquor, and thereby reduce the number of crystal nuclei formed by the initial contact of the incoming gas with the liquor, although, as the Chart data table shows, the average supersaturation of the liquor due to the initial contact of the gas with the liquor, will be slightly higher under operation condition 7 than under operation condition 6.

While the production of crystals from solutions has been the subject of much study in sugar and other industries during the past century, the laws and data relating to crystal formation and growth are not sufficiently established and known to make it possible to predict the precise sizes of the crystals produced in the use of the liquor and crystal dispersion method. It is to be noted, moreover, that practically all reliable available data on crystal formation and growth has been predicated on the formation of new crystals in a relatively large body of solution, and not on the formation of crystals by spraying finely divided particles of acidified ammonium sulphate liquor into reactive engagement with a gas containing a relatively minute amount of ammonia, which combines with the sulphuric acid in the liquor to form the fresh ammonium sulphate solution needed to maintain the process.

It is well recognized in the crystallization art that in the production of crystals the formation of crystalline nuclei and their subsequent growth are separate, though more or less closely related, steps. It is also generally known, that if new crystals form continuously and rapidly during the process, the crop will consist of many small crystals, while if only a few nuclei form at the start, a crop of relatively large uniform crystals may result. The formation of crystals and their growth result from a common driving force which is the supersaturation of the solution from which they are formed and in which they grow. However, the extent of the supersaturation affects the processes of crystal formation and crystal growth in a radically different manner.

For the purposes of the present invention the formation of new crystals in the crystallizing and desupersaturating bath seems unimportant. While some crystal nuclei may be formed in the crystallizing bath, the reduction of the temperature of the liquid as it passes through the bath is so relatively small, and the desupersaturation of the liquor is effected so rapidly, that the number of new crystals formed in the bath space is believed to be too small in comparison with the number of new crystals produced in the scrubbing space to have a significant bearing on the size of the crystals produced in the liquid and crystal dispersion process of producing sulphate of ammonia. In regular operation the major portion of the desupersaturation of the liquor passing out of the scrubbing space $a$ of Fig. 1, is effected in the few seconds required for the passage through the conduit E of a particle of liquor from the scrubbing space $a$ into the bath space of the tank G.

In the well known process of producing crystals of various compositions commonly referred to as the "Krystal" or "Jeremiassen" process, much stress is placed upon the necessity of preventing the supersaturation of the solution from which crystals are to be formed beyond the "metastable" range. A supersaturated solution is said to be in the metastable condition or range when its degree of supersaturation is not great enough to cause crystal nuclei to be formed spontaneously, unless the solution is subjected to some additional crystallizing force, such as that due to agitation or the presence of seed crystals or dust particles in the solution.

In the Krystal or Jeremiassen process, the liquor is supersaturated in one chamber and is then passed through an elongated flow path into a saturated crystal chamber in which the supersaturated liquor is desupersaturated, and if the supersaturation were to exceed the metastable range, time and opportunity for the formation of an excessively large number of new crystals would exist. No such need for avoiding some temporary supersaturation beyond the metastable range exists in the practice of the liquor and crystal dispersion process in which the supersaturation of the liquor is effected by bringing saturated particles of the liquor into contact with the gaseous ammonia and in which the supersaturation is effected while desupersaturation on a substantial scale is being effected by contact of the supersaturated liquor particles with ammonium sulphate crystals of substantial size sprayed into the scrubbing chamber with the liquor.

However, the conclusions reached in my study and use of that method, and the data given by the Chart data table and by the Screen test table, appear to be consistent with, and to confirm my conception that to make the average size of the crystals produced in the operation of apparatus of the type disclosed herein, relatively large, it is essential that the amount of liquor and crystals sprayed into initial contact with the gas be large enough to prevent the number of new crystals formed in the scrubbing space of the apparatus from being unduly large. So far as I now know, the only practical method of keeping the number of crystals newly formed in the scrubbing space suitably small, is to make the portion of that liquor sprayed into substantially instantaneous initial contact with the ammonia carrying the gas, large enough to prevent the supersaturation of the liquor to an extent which will exceed one per cent, and which may well be as small or smaller than a quarter of one per cent.

Fig. 4 is a chart comprising an abscissas line O—X, with a scale alongside it, which, like the abscissas scale of Fig. 3, represents thousands of gallons of lower inlet spray liquor discharged by nozzle D or DD per ton of salt. A scale graduated in percentages and varying from 0 to 100% is associated with the ordinate line OY of Fig. 4. The curve 35 of Fig. 4 is intended to illustrate the general manner in which the ammonium sulphate crystals formed under the different operating conditions 1 to 8 of the foregoing Chart data table may be expected to vary, when the amounts of inlet spray liquor and crystals vary as contemplated in Fig. 3. The points $p'$, $q'$, $s'$—$x'$ along the curve 35 of Fig. 4, are the points at which the gallons of inlet spray liquor per ton of salt produced, are respectively the same as those indicated by the points $p$, $q$, $s$—$x$ of Fig. 3. The displacement of each of the points $p'$, $q'$, $s'$—$x'$ from the line O—X, is a measure of the percentage of the salt crystals provided under the corresponding operating conditions, which are small enough to pass through a 35 mesh screen. Similarly, the displacement from the corresponding line O—X of each of the points $p''$, $q''$, $s''$—$x''$ along the curve 70, is a measure of the percentage of the salt crystals produced under the corresponding operating conditions which are small enough to pass through a 70 mesh screen.

It seems probable that the decrease in the size of the crystals which results from a decrease in the amount of the inlet nozzle spray liquor may be explained by the theory that the resultant increase in the supersaturation of that liquor increases the force which produces fresh crystal nuclei. It seems probable, also, that said force may be qualitatively indicated by the area RCF shown in Fig. 3 between the curve $p$—$x$ and the subjacent curve $rcf$.

The observation data which I have been able to accumulate is not sufficient to justify me in making close estimates of the sizes of the crystals which will be produced by operating apparatus of the general character shown in Fig. 1, in the range in which the inlet nozzle spray liquor per ton of ammonium sulphate varies between 20,000 gallons and 60,000 gallons. I have no doubt, however, that the average size of the crystals at every point along each of the curves 35 and 70 of Fig. 4 will increase as the amount of inlet spray liquor increases through said range.

A practically important characteristic of the liquor and crystal dispersion method, is the maintenance of a relatively large amount of ammonium sulphate crystals in contact with the acidified ammonium sulphate liquor in all portions of the continuous or closed circulation flow path including the scrubbing space, the crystallizing bath and the associated conduits. Ordinarily, I believe that the apparent crystal content of the acidified ammonium sulphate spray liquor and crystal mixture should be not less than about 20% and not higher than about 50%. The "apparent" crystal content of the mixture may be determined by filling a cylindrical graduate with the liquor and crystal mixture freshly withdrawn from the circulation path, and measuring the percentage of the total length of the graduate which contains crystals after the latter have been permitted to settle into a continuous crystal column in the lower portion of the graduate. When the settled crystals fill half the length of the graduate, the "apparent" crystal content of the liquor is 50%. The actual volume of the crystal half filling the graduate is about half the apparent volume or 25%. The specific gravity of the crystals is about 1.8.

This application is a continuation in part of my prior application Serial No. 168,801, filed June 17, 1950. Novel crystallizer construction and arrangement features disclosed in Fig. 1 and not claimed herein, are claimed in my concurrently filed application, Serial No. 195,253, filed November 13, 1950 and since abandoned, and in my pending application, Serial No. 242,835, filed August 21, 1951, as a continuation in part of my said abandoned application, Serial No. 195,253.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In producing ammonium sulphate by continuously spraying saturated ammonium sulphate liquor having a sulphuric acid content and an apparent entrained ammonium sulphate crystal content of not less than about 20% of the mixture of sulphate liquor and entrained crystals into a stream of gas having a small ammonia content as the gas passes through a scrubbing space within an enclosure having a gas inlet and a gas outlet displaced from said inlet, the improved method which includes the initial step of spraying into a small initial section of said space in proximity to said inlet a portion of said spray liquor large enough to substantially instantaneously convert a major portion of the ammonia content of the gas in said section into ammonium sulphate in liquor and crystalline form without supersaturating the liquor sprayed into said section more than about one per cent, and includes the second step of spraying into the larger section of said space between said initial section and said outlet into which the gas passes from said initial section, a portion of said spray liquor large enough to convert into ammonium sulphate in liquor and crystalline form substantially all of the ammonia content of the gas not so converted in said initial section.

2. A method as specified in claim 1, in which the portion of the spray liquor sprayed into the said initial section in said initial step is large enough to keep the supersaturation of the liquor in said section from exceeding one half of one per cent.

3. A method as specified in claim 1, in which the size of the crystals produced is regulated by varying the rate at which spray liquor is sprayed into said initial section in said first step.

4. A method as specified in claim 1, in which the liquor sprayed into said initial section in said first step forms a spray screen extending across the path of the gas stream through said space.

5. A method as specified in claim 1, in which the liquor sprayed into said initial section in said first step forms a hollow conical jet therein with its concave side facing, and its axis intersecting the stream of gas flowing through initial section.

6. In producing ammonium sulphate crystals of relatively large size, by continuously spraying saturated ammonium sulphate spray liquor having a sulphuric acid content and an apparent entrained ammonium sulphate crystal content of not less than about 20% of the mixture of sulphate liquor and entrained crystals, into a stream of gas having a small ammonia content as the gas passes through a scrubbing space within an enclosure having a gas inlet and a gas outlet displaced from said inlet, the improved method which comprises the step of spraying into a small initial section of said space in proximity to said inlet at least 20,000 gallons of said liquor per ton of crystals produced, and the step of spraying additional spray liquor into a larger section of said space between said inlet and said outlet into which the gas passes from said initial section, to thereby convert into ammonium sulphate in liquor and crystalline form, substantially all of the ammonia content of the gas not so converted in said initial section.

7. In producing ammonium sulphate by passing a gas having a small ammonia content continuously through a substantially unobstructed scrubbing space within an enclosure having a lower gas inlet and upper gas outlet, and continuously spraying a mixture of ammonium sulphate liquor having a sulphuric acid content and entrained ammonium sulphate crystals into said space, the apparent crystal content of said mixture being not less than about 20% the improved method step which consists in rapidly converting the major portion of the ammonia content of the gas into ammonium sulphate in solution and crystalline form by spraying not less than 50% of the total amount of liquor required to separate substantially all of the ammonia from the gas passing through said space into initial contact with the gas as the latter passes from said inlet through a small portion of said space adjacent said inlet, without supersaturating the liquor so sprayed more than one percent.

8. A method as specified in claim 7, in which the amount of liquor sprayed into said small portion of said space is not less than about two-thirds of the total amount of liquor sprayed into said space.

9. In producing ammonium sulphate by passing a gas having a small ammonia content continuously through a substantially unobstructed scrubbing space between a lower inlet to and an upper outlet from said space and continuously spraying ammonium sulphate crystals and acidified ammonium sulphate liquor into said space, the apparent crystal content of the acidified ammonium sulphate spray liquor and crystal mixture being not less than about 20%, the method which consists in spraying not less than 20,000 gallons of liquor and crystals per ton of ammonium sulphate salt produced into initial contact with the gas as it passes from said inlet into and through a relatively small portion of said space adjacent said inlet.

10. In producing ammonium sulphate by passing a gas having a small ammonia content continuously through a small inlet portion and thence through a large portion of a substantially unobstructed scrubbing space between a lower inlet to and an upper outlet from said space and continuously spraying a mixture of ammonium sulphate crystals and saturated ammonium sulphate liquor into said space, the apparent entrained ammonium sulphate crystals constituting not less than about 20% of said mixture, the improved method of producing relatively large ammonium sulphate crystals which comprises the step of spraying liquor and crystals at a rate of not less than 20,000 gallons and not more than 60,000 gallons per ton of ammonium sulphate produced, into initial contact with the gas as the latter passes from said inlet through a relatively small portion of said space in proximity to said inlet.

11. The method of producing ammonium sulphate which consists in continuously passing a gas having a small ammonia content through a substantially unobstructed scrubbing space from a lower inlet to said space to an upper outlet therefrom and continuously spraying a mixture of acidified saturated ammonium sulphate liquor and ammonium sulphate crystals, into initial contact with the gas as it passes from said inlet directly into a small adjacent section of said space, spraying additional acidified saturated ammonium sulphate liquor and ammonium sulphate crystals into contact with the gas in one or more portions of said space displaced towards said outlet from said inlet portion, the total apparent ammonium sulphate crystal content of the mixtures of crystals and ammonium sulphate liquir being not less than about 20%, and increasing and decreasing the average size of the crystals formed by respectively increasing and decreasing the amount of liquor and crystals sprayed into said small inlet section of said space.

12. In supersaturating acidified ammonium sulphate liquor by contact with gas having a small ammonia content which is continuously passing in a horizontally directed stream into the lower end of a vertical scrubbing chamber within a tank through a lateral opening in the tank wall, and thence passing upwardly through the tank to an outlet adjacent the upper end of the latter, the improved method which consists in spraying a portion of finely subdivided ammonium sulphate scrubbing liquor having a free sulphuric acid content and entraining ammonium sulphate crystals into said tank through said inlet opening at a rate of not less than about twelve thousand gallons of liquor and entrained crystals per ton of ammonium sulphate produced and thereby substantially instantaneously separating from the gas the major portion of its ammonia content, and spraying an additional portion of said subdivided scrubbing liquor and entrained crystals into said tank at one or more points displaced from said inlet toward said outlet to separate from the gas substantially all of said ammonia content not separated from the gas by the first mentioned portion of said scrubbing liquor, the total apparent entrained ammonium sulphate crystal content of the mixture of said crystals and ammonium sulphate scrubbing liquor being not less than about 20%.

13. In the production of ammonium sulphate by spraying a mixture of acidified ammonium sulphate liquor and entrained ammonium sulphate crystals into a scrubbing space through which gas having a small ammonia content is passing, the method of effecting a substantially instantaneous initial contact of a large volume of the gas with the liquor, which consists in passing into said space a stream of gas substantially smaller in cross section than said space and expanding the gas stream as it enters said space and spraying liquor into said space to form a spray screen in front of the expanding gas stream in position for substantially simultaneous engagement of the liquor in said stream by gas in all portions of the cross section of the expanded gas stream, the apparent entrained ammonium sulphate crystal content of said mixture being not less than about 20%.

References Cited in the file of this patent

UNITED STATES PATENTS

| | | |
|---|---|---|
| 824,092 | Brunck | June 26, 1906 |
| 885,980 | Crossley | Apr. 28, 1908 |
| 1,913,955 | Reagin | June 13, 1933 |
| 1,971,563 | Hirschkind | Aug. 28, 1934 |
| 2,000,038 | Schmalenbach | May 7, 1935 |
| 2,308,612 | Lehmkuhl | Jan. 19, 1943 |
| 2,375,922 | Jeremiassen | May 15, 1945 |
| 2,482,643 | Tiddy | Sept. 20, 1949 |
| 2,599,067 | Otto | June 3, 1952 |

FOREIGN PATENTS

| | | |
|---|---|---|
| 20,875 | Great Britain | 1910 |
| 313,446 | Great Britain | Mar. 6, 1930 |